United States Patent
Stritzel et al.

(10) Patent No.: US 9,489,440 B2
(45) Date of Patent: Nov. 8, 2016

(54) OPPORTUNISTIC, PRIORITY-BASED OBJECT SYNCHRONIZATION

(71) Applicant: Microsoft Corporation, Redmond, WA (US)

(72) Inventors: Adam Stritzel, Redmond, WA (US); John E. Brezak, Woodinville, WA (US); Chin Hung Lam, Bellevue, WA (US); Patrick Richard Jakubowski, Seattle, WA (US); Ciprian Gociman, Woodinville, WA (US); Joerg Christof Zender, Renton, WA (US); David Bennett, Bothell, WA (US); Sarita Gupta, Bellevue, WA (US); Nicholas Malaguti, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 42 days.

(21) Appl. No.: 13/713,686

(22) Filed: Dec. 13, 2012

(65) Prior Publication Data
US 2014/0172793 A1 Jun. 19, 2014

(51) Int. Cl.
*G06F 17/30* (2006.01)

(52) U.S. Cl.
CPC ... *G06F 17/30575* (2013.01); *G06F 17/30162* (2013.01)

(58) Field of Classification Search
CPC .......... G06F 17/30162; G06F 17/30578; G06F 17/30277; G06F 17/3058; G06F 3/065
USPC ............. 707/620, 634, 640; 709/203, 248
See application file for complete search history.

(56) References Cited

U.S. PATENT DOCUMENTS

| 5,937,414 A | 8/1999 | Souder |
| 7,564,799 B2 | 7/2009 | Holland |
| 2004/0005020 A1* | 1/2004 | Dent ............................. 375/343 |

(Continued)

OTHER PUBLICATIONS

L. Kocarev et al., Generalized Synchronization, Predictability, and Equivalence of Unidirectionally Coupled Dynamical Systems, Google, Mar. 11, 1996, 1816-1819.*
Pagonis, John, "GPRS Facts for the Internet Application Developer"—Published Date: Jul. 2003, pp. 1-3, http://www.pagonis.org/PaperArchive/GPRSFactsInternetApplicationDeveloper_pt1.pdf.

(Continued)

*Primary Examiner* — Jean B Fleurantin
(74) *Attorney, Agent, or Firm* — Timothy Churna; Dan Choi; Sandip Minhas

(57) ABSTRACT

Mechanisms for synchronizing an object set with a remote data store are often performed at a particular frequency, e.g., once per hour or day. However, the objects of the object set may have different priorities, and it may be advantageous to synchronize higher-priority objects more often than regular-priority objects. The synchronization mechanisms may also differ (e.g., high-priority object synchronization may be direct and/or holistic, while regular-priority object synchronization may be differential, cached, and/or involving version and/or conflict resolution). Additionally, a resource-based threshold may be applied to the high-priority objects (e.g., a bandwidth cap) in order to reduce resource exhaustion, and high-priority objects that are not synchronized within the threshold may be synchronized with the regular-priority objects. These techniques may be particularly advantageous for synchronizing objects comprising an application state of applications of current or recent usage by a user, where application state "staleness" is acutely visible to the user.

20 Claims, 7 Drawing Sheets

(56) References Cited

U.S. PATENT DOCUMENTS

| | | |
|---|---|---|
| 2005/0257122 A1 | 11/2005 | Litwin, Jr. |
| 2006/0218224 A1* | 9/2006 | Agrawal et al. .............. 709/201 |
| 2009/0112915 A1* | 4/2009 | Lele et al. ................... 707/102 |
| 2009/0150569 A1* | 6/2009 | Kumar et al. ............... 709/248 |
| 2009/0282169 A1* | 11/2009 | Kumar et al. ............... 709/248 |
| 2009/0327390 A1 | 12/2009 | Tran |
| 2011/0185202 A1* | 7/2011 | Black et al. ................. 713/320 |
| 2012/0314677 A1* | 12/2012 | Gilder .......................... 370/329 |

OTHER PUBLICATIONS

Brodsky, Dmitry D., "Policy Driven Replication"—Published Date: Feb. 2005, pp. 1-80, http://citeseerx.ist.psu.edu/viewdoc/download-?doi=10.1.1.70.9681&rep=rep1&type=pdf.

"Pathways to innovation"—Published Date: Apr. 2009, pp. 1-151, http://www05.abb.com/global/scot/scot271.nsf/veritydisplay/bd5b4cf6ebee739cc1257688002e4a84/$file/abb%20review%204-2009_72dpi.pdf.

* cited by examiner

OPPORTUNISTIC, PRIORITY-BASED OBJECT SYNCHRONIZATION

BACKGROUND

Within the field of computing, many scenarios involve a synchronization of the objects of an object set between a local data store and a remote data store. The synchronization may be unidirectional (e.g., altering the remote data store to match the local data store, or vice versa) or bidirectional (e.g., merging changes in the remote data store and the local data store), and/or holistic (e.g., copying entire objects from the local data store to the remote data store) or differential (e.g., copying deltas of the objects from the local data store to a remote device for application to the objects of the remote data store). Such scenarios may be performed with many variations, such on a desired frequency; throttled to conserve bandwidth; and with various types of rules for resolving versioning conflicts.

For example, a bidirectional synchronization may be performed by comparing each object in the local data store and the remote data store, choosing the later-updated of the compared objects, and copying the later-updated object over the earlier-updated object. Each object of the object set may be synchronized in the same manner, until the object sets are identical.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many scenarios, the synchronization of the object set may be performed without particular regard to the types of objects comprising the object set. For example, a bidirectional synchronization may simply iterate through a sequence of objects, irrespective of the order or types of the objects. If the object set is large, this iterative synchronization may be protracted, such that some object updates may take a while to propagate.

However, in many such scenarios, it may be desirable to perform the synchronization differently for different types of objects. In particular, it may be desirable to synchronize high-priority objects at a higher frequency than regular-priority objects, e.g., in order to propagate changes among the high-priority objects between the local data store and the remote data store faster than for regular-priority objects. One such scenario involves the synchronization of objects comprising an application state of an application that a user is currently or has recently used on one device, and may continue using on another device. A delayed propagation of changes to the application state in a prompt manner may be more noticeable to the user than delays in propagating changes to objects that the user has not utilized in a while.

In view of these differences in object types, presented herein are techniques for configuring a device to perform a priority-based synchronization of an object set with a remote data store, where regular-priority objects are synchronized with the remote data store at a regular-priority synchronization frequency, while high-priority objects (as identified by various criteria) are synchronized at a high-priority synchronization frequency that is greater than the regular-priority synchronization frequency. Moreover, in order to avoid exhausting the resources of the device, the high-priority synchronization may be throttled, e.g., by applying a bandwidth cap only during the high-priority synchronization. High-priority objects that are not synchronized during the high-priority synchronization (e.g., those for which synchronization may exceed the bandwidth cap) may be synchronized during the regular-priority synchronization. These techniques enable a tradeoff between more frequent synchronization of high-priority objects and conservation of computing resources.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
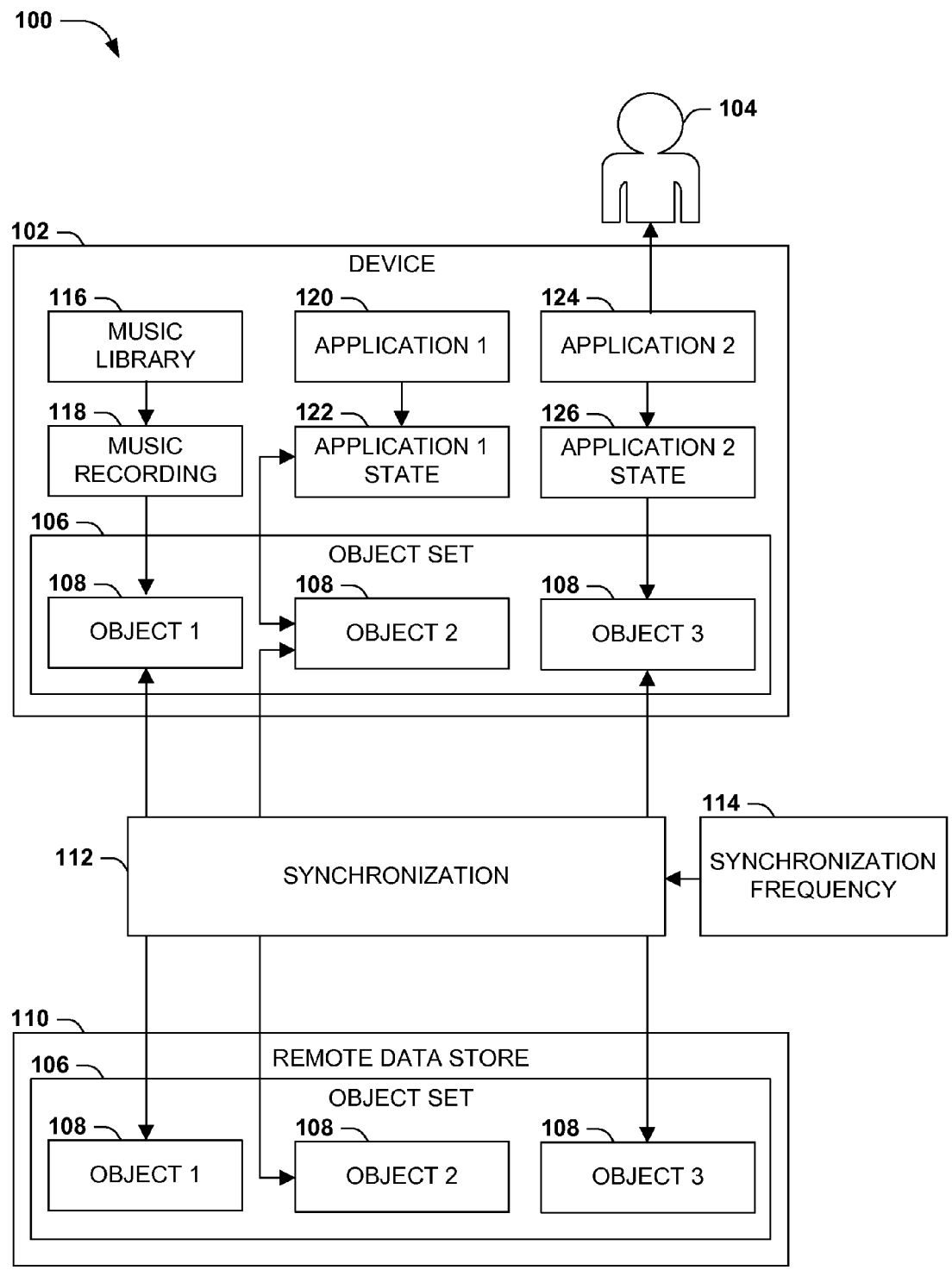
FIG. 1 is an illustration of an exemplary scenario featuring a device configured to synchronize an object set with a remote data store.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve a synchronization of an object set between a device and a remote data store. As a first example, the object set may comprise a set of files, and the device and remote data store may each store a copy of the file set and may interoperate to maintain synchrony therebetween. As a second example, the object set may comprise a set of database records stored by both the device and a database server, and the device and the database server may interoperate to propagates updates to one version of the database with the other version.

In these and other scenarios, the device and the remote data store may perform many types of synchronization in order to maintain synchrony between the versions of the object set stored in each location. As a first example, a unidirectional synchronization may be performed to propagate changes from the device to the remote object store (e.g., the device may store the authoritative version of the object set, and the synchronization may always endeavor to alter the remote object store to match the local device), or vice versa. Alternatively, a bidirectional synchronization may be performed, wherein any object update on either the device or the remote data store is propagated to the other object set. For example, in a simple bidirectional synchronization, the device and remote data store may compare every object in the object set. Objects existing only in one of the object sets may be copied into the other object set; and for objects existing in both object sets, the modification dates may be compared, the later-modified version of the object may be copied over the earlier-modified version of the object. More sophisticated bidirectional synchronization techniques may involve journaling, e.g., wherein one or both of the device and the remote data store maintain a journal of updates as a more efficient technique for identifying differences between the object sets. As a second example, the synchronization may be holistic (e.g., where any object to be updated in one version of the object set is entirely copied from the other version of the object set) or differential (e.g., where an update of an object in one version of the object set is achieved by receiving and applying a "diff" or delta, indicating how the old object is to be modified in order to match the new version of the object).

FIG. 1 presents an illustration of an exemplary scenario 100 featuring a device 102 operated by a user 104 and configured to synchronize an object set 106, comprising a plurality of objects 108, with a remote data store 110. For example, the objects 108 may include a music recording 118 stored in a music library 116; a first object representing an application state 122 of a first application 120 (e.g., a user document, user preferences set, or an application data cache); and a second object representing an application state 122 of a second application 120 that is currently or has recently been used by the user 104. The synchronization 112 performed between the device 102 and the remote data store 110 may involve, e.g., an iterative comparison of each object 108 in order to determine the later-updated version of the object 108, which may be copied from the device 102 to the remote data store 110 or vice versa. The user 104 may configure the device 102 and/or the remote data store 110 to initiate the synchronization 112 at a synchronization frequency 114, such as once an hour or once per day (optionally at a particular time). It may be appreciated that a higher synchronization frequency propagates changes faster but also consumes more computational resources (e.g., processor capacity, network bandwidth, and power).

In addition to the synchronization frequency 114, in view of the synchronization scenario, the type of objects 108 comprising the object set 106, and the resources of the device 102 and the remote data store 110, many factors of the synchronization 112 may vary. As a first such example, the user 104 may specify a variety of rules for identifying object updates (e.g., by comparing the entire binary contents of each version of the object 108; by comparing a hashcode computed for each version of the object 108; by comparing the modification dates of the versions of the objects 108; and/or by consulting a journal 108 stored by the device 102 and/or the remote data store 110). As a second such example, the user 104 may specify a variety of rules for performing version conflicts (e.g., the manner of choosing the version of an object 108 to be kept in case two versions of an object 108 are found to differ). These and other properties may be altered to achieve various types of synchronization 112 of the object set 106.

B. Presented Techniques

While the synchronization 112 performed in the exemplary scenario 100 of FIG. 1 may succeed in maintaining synchrony of the object set 106 between the device 102 and the remote data store 110, it may be appreciated that some aspects may present some disadvantages. For example, the synchronization 112 may be achieved by iterating over all of the objects 108 of the object set 106, in no particular order, and performing the comparison and updating. However, it may be appreciated that different objects 108 may have different semantics, such as different amounts of visibility in the "staleness" of an object 108 on the device 102 and/or the remote data set 110. As one such example, the device 102 may comprise a set of applications, and some objects 108 may comprise the application state of an application. Moreover, the user 104 may apply the synchronization 112 to achieve synchrony of the application states of the applications of the device 102 and other devices 102 that also synchronize with the remote data store 110 (e.g., a shared browser session that maintains a current set of web pages, the states of the web pages, and the contents of the cookie cache among two or more devices 102, such that the user 104 may continue interacting with the same set of web pages even while switching devices 102).

In such scenarios, it may be desirable to maintain synchrony of the objects 108 comprising the application state 126 of the second application 124, which is currently in use by the user 104, than for other objects 108, such as the application state 122 of the first application 120 that is not in use, and of the music recordings 118 of a music library 116. However, if all of the objects 108 are synchronized at a synchronization frequency 114 that is generally selected for the object set 106 (e.g., synchronizing once per hour or once per day), then the application state 126 of the second application 124 may appear to be frequently and/or extensively stale on the device 102, the remote data store 110, and/or other devices 102 that also synchronize with the remote data store 110 (e.g., the other devices 102 may present web browsers reflecting an outdated set of web pages and an outdated cookie cache). Conversely, the synchronization frequency 114 may be raised significantly in order to maintain an acceptable degree of "staleness" of the application state 126 of the second application 124 (e.g., once every ten minutes), but if such high-frequency synchronization 112 involves the entire object set 106, the device 102 and remote data store 110 may expend considerable computational resources (e.g., processor capacity, bandwidth, and battery or utility power) performing an extensive comparison of many objects 108 that have not changed, thereby creating significant inefficiency.

It may be appreciated that this problem arises due to the insensitivity of the synchronization 112 in the exemplary scenario 100 of FIG. 1 to distinguish among the objects 108 based on priority, e.g., distinguishing objects 108 of a higher priority that are to be synchronized more frequently from objects 108 of a regular priority that are to by synchronized less frequently. The synchronization 112 may therefore be altered to identify the priorities of the objects 108, and to synchronize different objects 108 at different synchronization frequencies 114 based on identified priorities. However, synchronization 112 involving a higher synchronization frequency 114 may exhaust the resources of the device 102 and/or remote data store 110; e.g., if the user 104 is actively using the second application 124 and the second application state 126 is changing continuously, the device 102 may synchronize the object 108 associated with the second application state 126 with the remote data store 110 very frequently (e.g., once per minute), which may present an inefficient utilization of computing resources as compared with the value to the user 104 of constantly synchronized application state 126. Therefore, in addition to considering the comparative priorities of the objects 108, the device 102 and/or remote data store 110 may be further adapted to perform a higher-frequency synchronization opportunistically, i.e., while the computing resources of the device 102 and/or remote data store 110 that are involved in the synchronization 112 (e.g., processor capacity, bandwidth, and/or power) remain within an acceptable high-priority data threshold. When this threshold is exceeded, the high-priority synchronization may be throttled back to the frequency of the regular-priority synchronization. In this manner, the synchronization 112 may be adapted to achieve more frequent synchronization of higher-priority objects 108 while also conserving the computational resources of the device 102 and/or remote data store 110.

Figure 2:
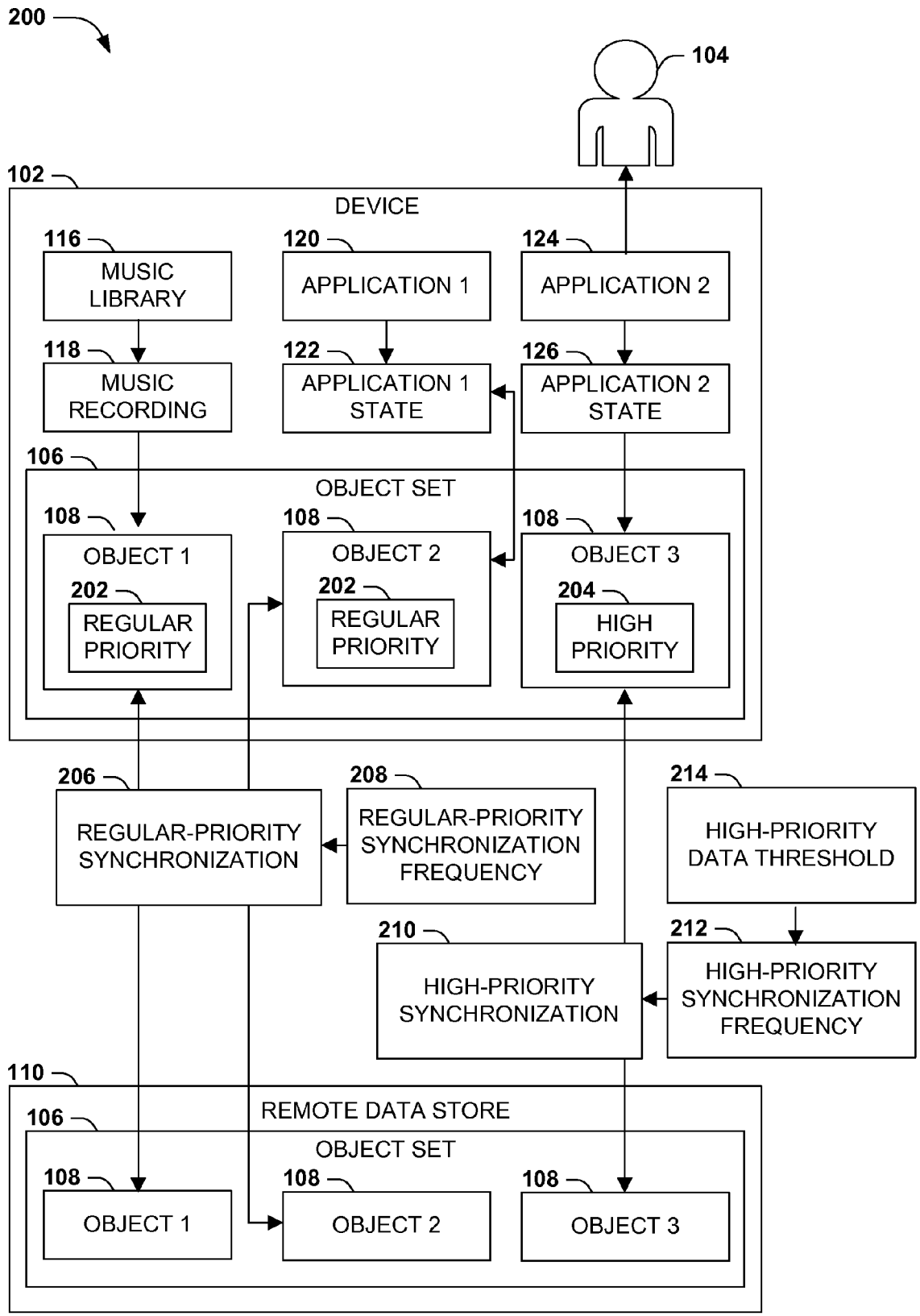
FIG. 2 is an illustration of an exemplary scenario featuring a device configured to perform an opportunistic, priority-based synchronization of an object set with a remote data store in accordance with the techniques presented herein.

FIG. 2 presents an illustration of an exemplary scenario 200 featuring an opportunistic, priority-based synchronization of the objects 108 of an object set 106 between a device 102 operated by a user 104 and a remote data store 110 in accordance with the techniques presented herein. In this exemplary scenario 200, the device 102 again provides a set of objects 108 comprising different roles or types, such as a first object 108 comprising a music recording 118 in a music library 116, a second object 108 comprising a first application state 112 of a first application 120 that is not in use by the user 104, and a third object 108 comprising a second application state 126 of a second application 124. The object set 106 also exists in a remote data store 110, and the device 102 and the remote data store 110 may interoperate to maintain synchrony of the object set 106 therebetween. However, in this exemplary scenario 200, respective objects 108 also have a priority, identified as either a regular priority 202 or a high priority 204. As further illustrated in this exemplary scenario 200, the priority is based on the association with an application state 126 of an application 124 that is currently or has recently been used by a user 104, although many other criteria of establishing priority may be identified. The synchronization 112 of the object set 106 is achieved by applying a regular-priority synchronization 206 at a regular-priority synchronization frequency 208 (e.g., once per day) to the objects 108 having a regular priority 202, and a high-priority synchronization 210 at a high-priority synchronization frequency 212 (e.g., once per hour) to the objects 108 having a high priority 204. In this manner, the third object 108 representing the application state 126 of the second application 124 that is currently or recently used by the user 104 may be synchronized more often than the other objects 108 of the object set 106. Moreover, the high-priority synchronization 210 may be limited by a high-priority data threshold 214, e.g., a maximum bandwidth or data usage that may be consumed by the high-priority synchronization 210 within a particular synchronization instance or time period. If the high-priority data threshold 214 is exceeded, the high-priority objects 108 may be synchronized as part of the regular-priority synchronization 206 in order to avoid exhausting the computational resources of the device 102 and/or the remote data store 110. In this manner, the synchronization 112 of the object set 106 may be adjusted to accommodate both the relative priorities of the objects 108 and the efficient use of computational resources in accordance with the techniques presented herein.

C. Exemplary Embodiments

Figure 3:
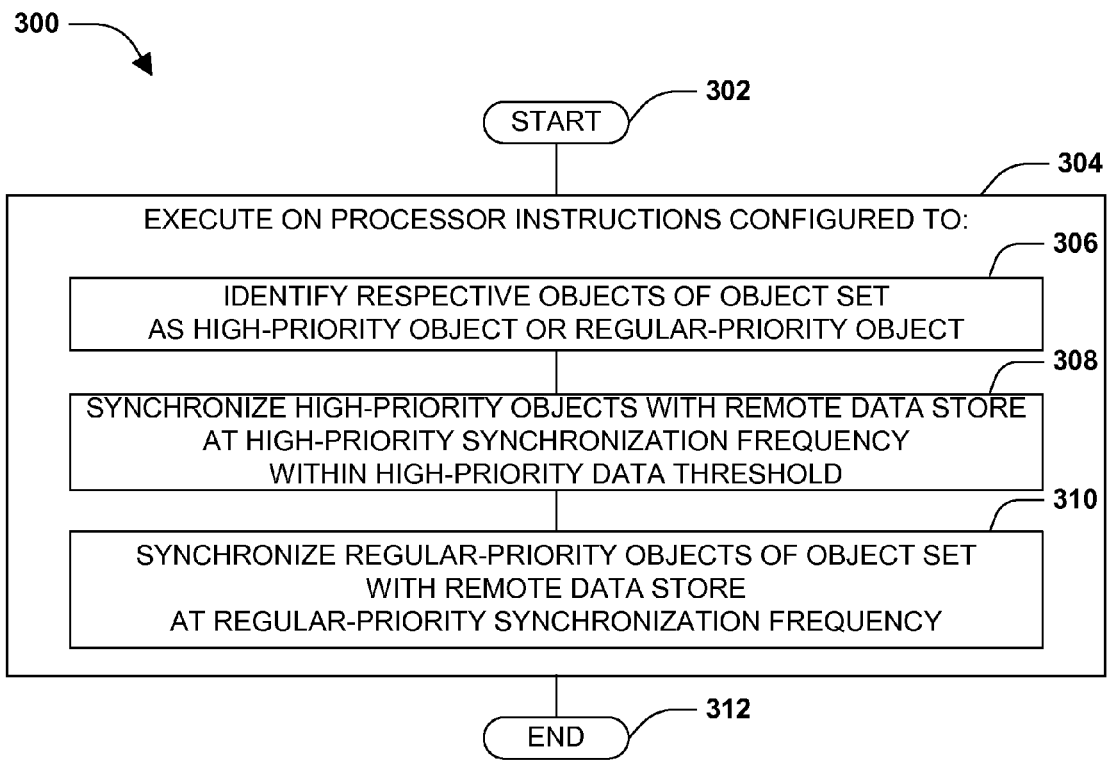
FIG. 3 is an exemplary method of synchronizing an object set with a remote data store in accordance of the techniques presented herein.

FIG. 3 presents a first embodiment of the techniques presented herein, illustrated as an exemplary method 300 of synchronizing objects 108 of an object set 106 with a remote data store 110 on a device 102 having a processor. The exemplary method 300 may be implemented, e.g., as a set of instructions stored in a memory component of the device 102 (e.g., a memory circuit, a platter of a hard disk drive, a solid-state storage device, or a magnetic or optical disc) and arranged such that, when the instructions are executed on the processor, cause the device 102 to operate according to the techniques presented herein. The exemplary method 300 begins at 302 and involves executing 304 the instructions on the processor. In particular, the instructions are configured to identify 306 respective objects 108 of the object set 108 as a high-priority object or a regular-priority object. The instructions are further configured to synchronize 308 the high-priority objects 108 of the object set 106 with the remote data store 110 at a high-priority synchronization frequency 212, and within a high-priority data threshold 214. The instructions are further configured to synchronize 310 the regular-priority objects 108 of the object set 106 with the remote data store 110 at a regular-priority synchronization frequency 208 that is lower than the high-priority synchronization frequency 212. By partitioning the synchronization 112 into a high-priority synchronization 210 and a regular-priority synchronization 206, the exemplary method 300 achieves the synchronization 112 of the object set 106 with the remote data store 110 according to the techniques presented herein, and so ends at 312.

Figure 4:
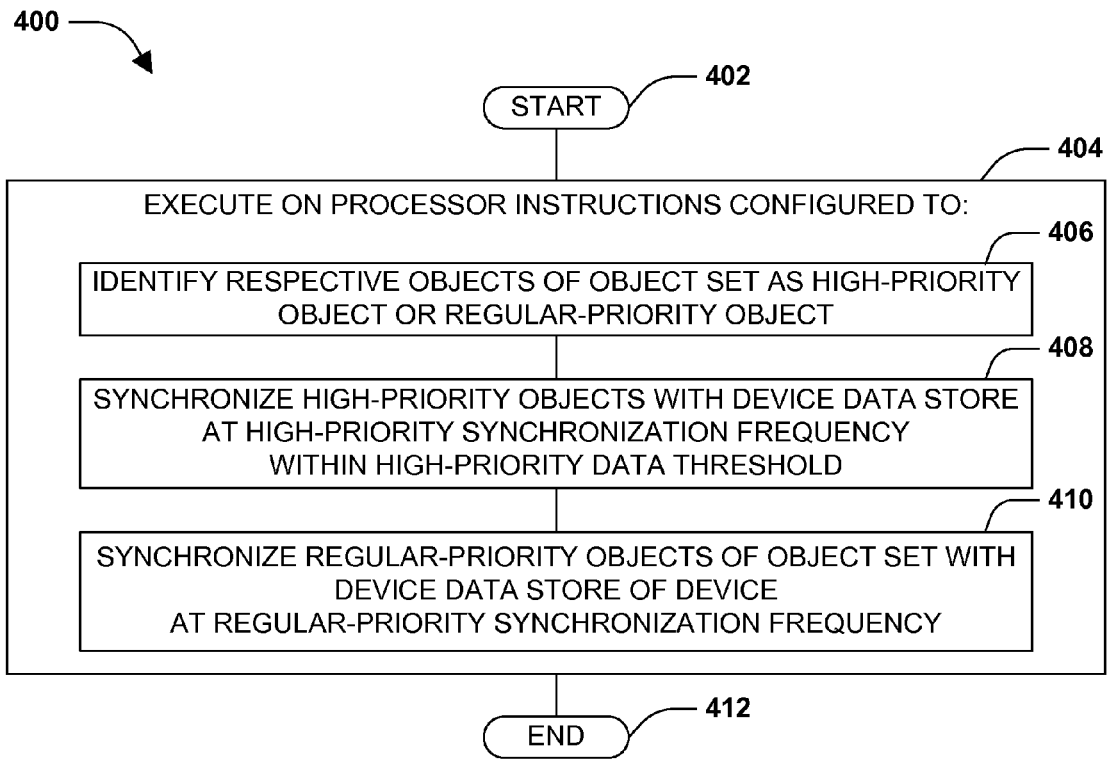
FIG. 4 is an exemplary method of configuring a server (such as a remote data store) to synchronize an object set with a device data store in accordance with the techniques presented herein.

FIG. 4 presents a second embodiment of the techniques presented herein, illustrated as an exemplary method 400 of synchronizing an object set 106 with a device data store of a device 102. The exemplary method 400 may be implemented, e.g., as a set of instructions stored in a memory component of the device 102 (e.g., a memory circuit, a platter of a hard disk drive, a solid-state storage device, or a magnetic or optical disc) and arranged such that, when the instructions are executed on the processor, cause the device 102 to operate according to the techniques presented herein. The exemplary method 400 begins at 402 and involves executing 404 the instructions on the processor. In particular, the instructions are configured to identify 406 respective objects 108 of the object set 106 as a high-priority object or a regular-priority object. The instructions are further configured to synchronize 408 the high-priority objects 108 of the object set 106 with the device data source of the device 102 at a high-priority synchronization frequency 212, and within a high-priority data threshold 214. The instructions are further configured to synchronize 410 the regular-priority objects 108 of the object set 106 with the device data store of the device 102 at a regular-priority synchronization frequency 208 that is lower than the high-priority synchronization frequency 212. By partitioning the synchronization 112 into a high-priority synchronization 210 and a regular-priority synchronization 206, the exemplary method 400 achieves the synchronization 112 of the object set 106 with the device data store of the device 102 according to the techniques presented herein, and so ends at 412.

Figure 5:
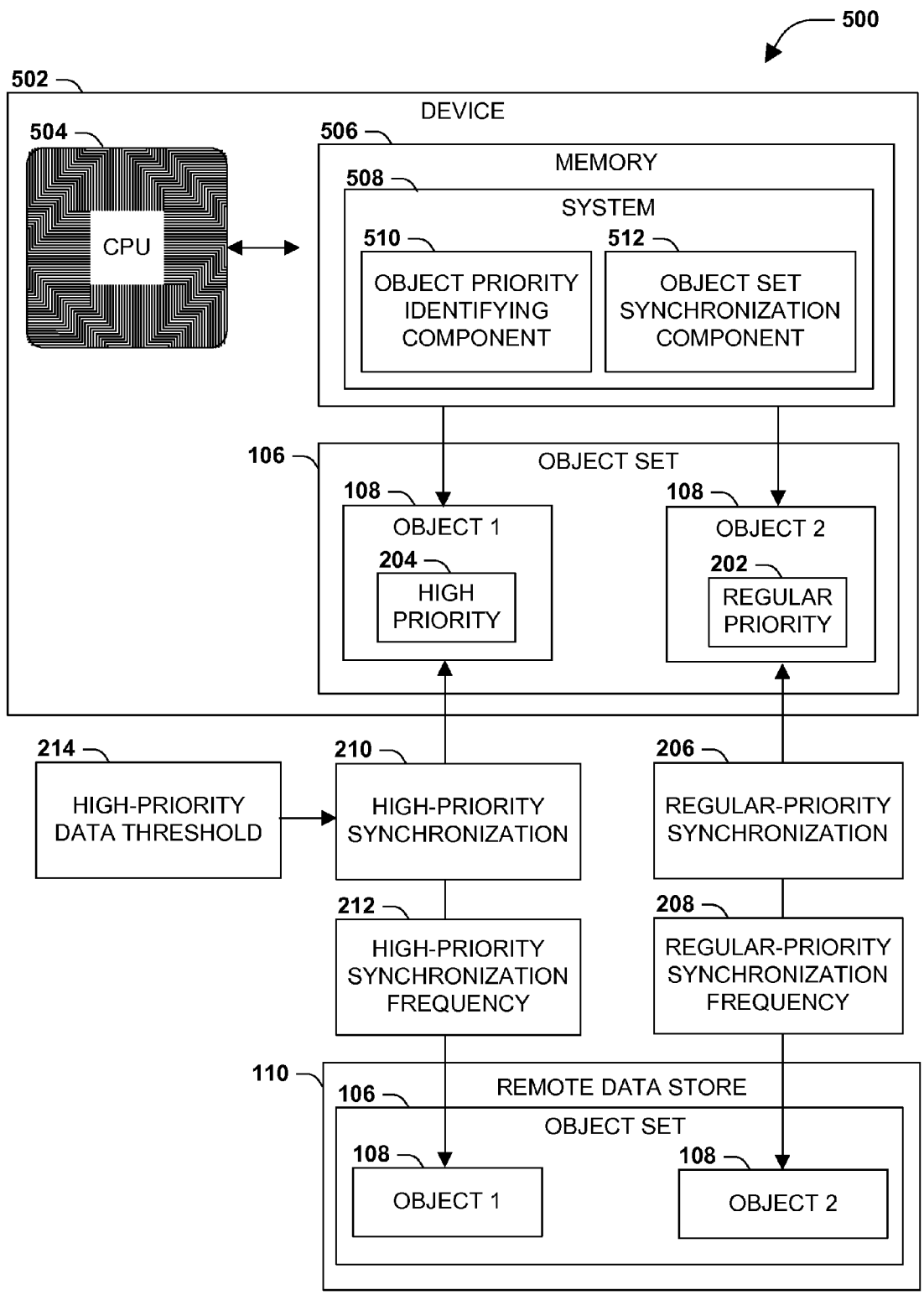
FIG. 5 is an illustration of an exemplary scenario featuring an exemplary system for synchronizing an object set with a remote data store in accordance with the techniques presented herein.

FIG. 5 presents an illustration of a third exemplary embodiment, illustrated as an exemplary system 508 configured to synchronize objects 108 of an object set 106 with a remote data store 110 on a device 502 having a processor 504. The exemplary system 508 may be implemented, e.g., as a set of instructions stored in a memory component 506 of the device 502 (e.g., a memory circuit, a platter of a hard disk drive, a solid-state storage device, or a magnetic or optical disc) and arranged such that, when the instructions are executed on the processor 504, cause the device 502 to operate according to the techniques presented herein. The exemplary system 508 comprises an object priority identifying component 510, which is configured to identify respective objects 108 of the object set 106 as a high-priority object or a regular-priority object. The exemplary system 508 also comprises an object set synchronization component 512, which is configured to synchronize the high-priority objects of the object set 106 with the remote data store 110 at a high-priority synchronization frequency 212 and within a high-priority data threshold 214, and to synchronize the regular-priority objects of the object set 106 with the remote data store 110 at a regular-priority synchronization frequency 208 that is lower than the high-priority synchronization frequency 212. In this manner, the exemplary system 508 causes the device 502 to operate according to the techniques presented herein.

A fourth embodiment of the techniques presented herein may comprise an computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
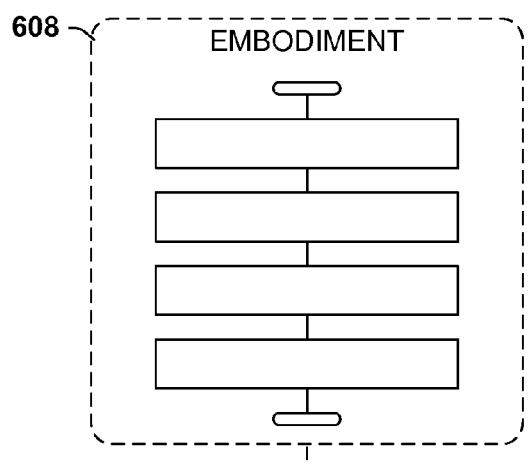
FIG. 6 is an illustration of an exemplary computer-readable storage medium comprising instructions that are configured in accordance with the techniques presented herein.
Figure 6:
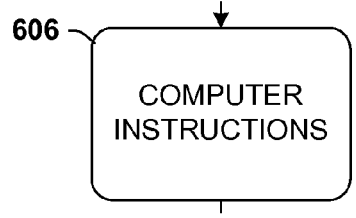
Figure 6:
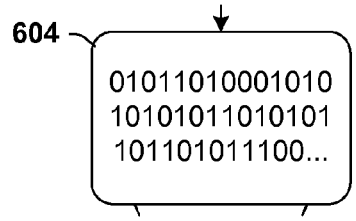
Figure 6:
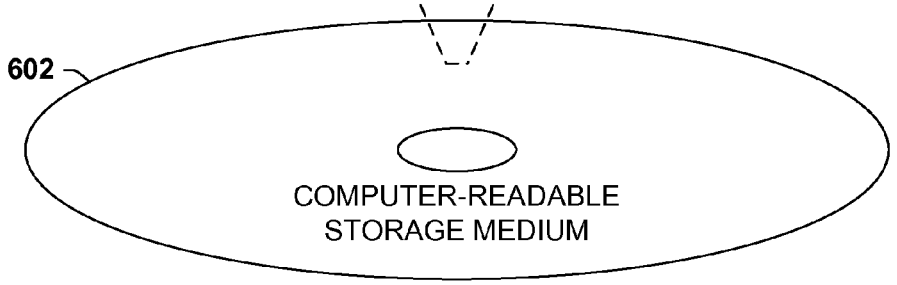

An exemplary computer-readable medium that may be devised in these ways is illustrated in FIG. 6, wherein the exemplary embodiment 600 comprises a computer-readable storage medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 102, such as servers, server farms, workstations, laptops, tablets, mobile phones, local storage devices such as hard disk drives, game consoles, and network appliances such as network-attached storage (NAS) devices. Such devices 102 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the remote data store 110 may also comprise many types of devices, including those provided above with respect to the types of the device 102. The device 102 and the remote data store 110 may also comprise equivalent device types or different device types. The remote data store 110 may also comprise a network-based service provided by a file server, an object server, a database server, or an email server. Such services may be provided via a local area network (LAN) such as a local WiFi or cellular network, or a wide area network (WAN) such as a cloud service provided via the Internet. Additionally, the device 102 and the remote data store 110 may interact in a client/server relationship (with the device 102 operating as either the client or the server), in a peer-to-peer relationship, in a hybrid relationship, or in a different type of relationship.

As a third variation of this first aspect, the object set 106 may comprise many types of objects 108, such as files, documents, media objects, application binaries, database records, email messages or mailboxes, or interactive agents. The object set 106 may also comprise a mixture of such object types, e.g., a portion or entirety of the data comprising a computing environment of the device 102, such as the files, user profiles, applications, application settings, and application state representations used by the device 102 to present the computing environment to the user 104. Many such scenarios may advantageously utilize a variation of the techniques presented herein.

D2. Identifying Object Priority

A second aspect that may vary among embodiments of these techniques involves the manner of identifying the priority of respective objects 108 of the object set 106 as a high priority 204 or a regular priority 202.

As a first variation of this second aspect, many criteria may be used to determine the priority of an object 108. For example, this determination may be based on at least one prioritization criterion selected from a prioritization criteria set comprising an object type of the object 108; a data access frequency of the object 108 (e.g., how frequently the user 104 or an application accesses the object 108); a data update frequency of the object 108 (e.g., how frequently the user 104 or an application updates the object 108); a data significance of the object 108 (e.g., an indication from a user 108 or an application that an object 108 is of high significance or regular significance); a relationship with a second object 108 of the object set 106 (e.g., a dependency relationship with a high-priority object 108); and a user preference of a user 104 of the device 102 (e.g., an indication that the user 108 wishes to have a particular object 108 synchronized with a high frequency).

As a second variation of this second aspect, the device 104 may comprise a high-priority object synchronization policy that identifies the objects 108 to be regarded as high priority 204 and regular priority 202. For example, the high-priority object synchronization policy may indicate that all objects 108 associated with an application 124 that is currently or has recently been invoked by the user 104 (optionally defining a utilization duration within which the application 124 is regarded as "recently" utilized, e.g., invoked by the user 104 within the last hour) is to be regarded as high priority 204, and all other objects 108 are to be regarded as regular priority 202. As another example, the high-priority object synchronization policy may also indicate that the priority determination is to be based on the role of the user 104 associated with the object 108; e.g., objects 108 associated with a high-ranking user 104 may be synchronized at a higher frequency than those associated with lower-ranking users 104.

As a third variation of this second aspect, the device 104 may perform the priority determination with many times of timing with respect to the synchronization 112. As a first such example, the determination may be made on an ad hoc basis; e.g., when the time arrives to synchronize a particular object 108, the object 108 may be identified as either high priority 204 or regular priority 202. As a second such example, the determination may be made in advance. For example, the device 102 may periodically or continuously evaluate the objects 108 to determine the priority thereof, and may associate high-priority objects 108 with a high-priority object identifier (e.g., setting a priority metadata bit in a file system entry of a file system associated with the object 108). This determination may be altered or updated in response to particular events (e.g., clearing the priority metadata bit of an object 108 that is unused for particular duration, or setting the priority metadata bit of an object 108 upon a user interaction with the object 108). At the time of synchronization 112, the device 102 may then perform the priority determination simply by determining whether or not the object 108 is associated with a high-priority object identifier. By persisting and reusing determinations made before the synchronization 112, this variation may expedite the synchronization 112 by utilizing precomputed metadata rather than performing the determination anew for each object 108. Many such variations in the priority determination of the objects 108 may be included in various embodiments of the techniques presented herein.

D3. Synchronization Variations

A third aspect that may vary among embodiments of these techniques relates to the manner of synchronizing the objects 108 of the object set 106 between a device 102 and a remote data store 110.

As a first variation of this third aspect, the high-priority objects 108 and the regular-priority objects 108 may be synchronized in different ways. As a first such example, the high-priority objects 108 may be directly synchronized with the remote data store 110 (e.g., for each such object 108, directly comparing the versions of the object 108 in the local data store and the remote data store 110), while the regular-priority objects 108 may be synchronized with the remote data store 110 through an object cache, where all such updates may be stored upon detecting the update and efficiently synchronized as a batch. As a second such example, the high-priority objects 108 may be holistically synchronized with the remote data store 110 (e.g., comparing and/or copying the entire object 108), while the regular-priority objects 108 may be synchronized as an object update (e.g., generating a "diff" or delta that may be applied to an older version of the object 108 stored on the remote data store 110 to transform it into the newer version of the object 108 stored on the device 102, and sending the "diff" or delta to the remote data store 110, or vice versa). Such differences may be advantageous, e.g., in scenarios where the high-priority objects 108 are likely to be small in both number and size (such as in scenarios where the high-priority objects 108 represent the application state 126 of an application 124), wherein directly and holistically synchronizing the small object set 108 may be frequently performed at a high frequency, while the remaining objects 108 of the object set 106 may be synchronized as object updates stored in an object update cache.

Figure 7:
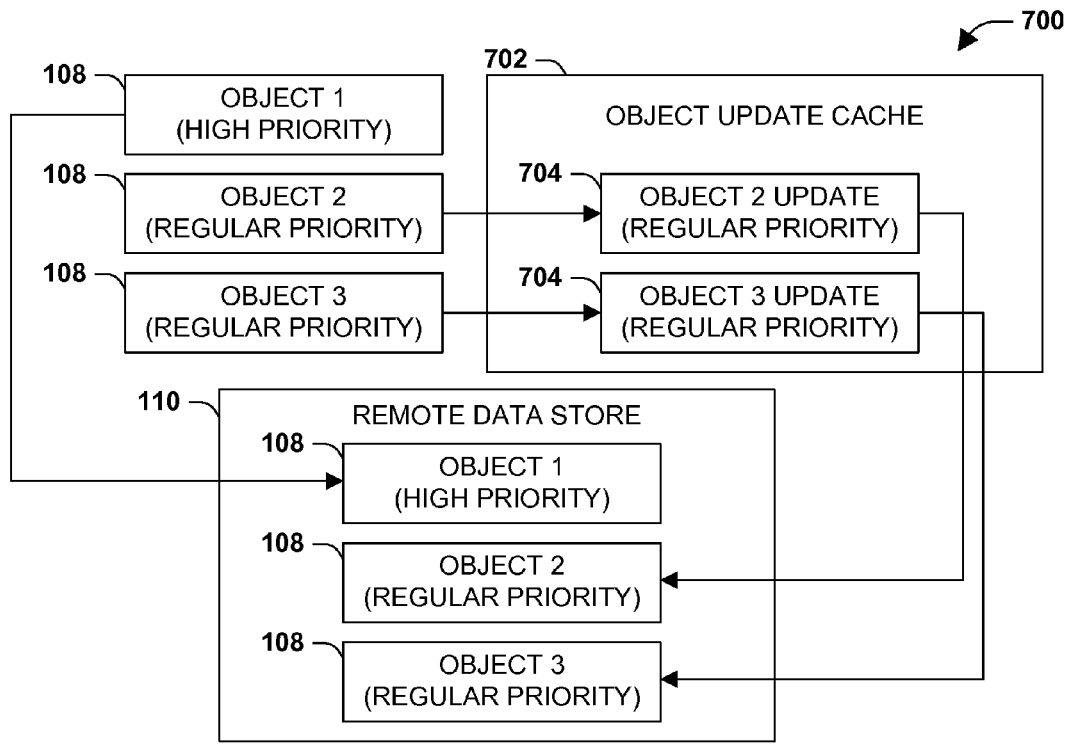
FIG. 7 is an illustration of an exemplary scenario featuring a variation of a priority-based synchronization of an object set with a remote data store.

FIG. 7 presents an illustration of an exemplary scenario 700 featuring a differential synchronization of an object set 106 on a device 102 having an object update cache 702 that is configured to store object updates 704. In this exemplary scenario 700, respective objects 108 are identified as either high priority 204 or regular priority 202, and different synchronization techniques are used for each object type. In particular, a high-priority object 108 is directly and holistically synchronized with the remote data store 110 during the high-priority synchronization 210 at the high-priority synchronization frequency 212. Updates to regular-priority objects 108 are stored in the object update cache 702 as an object update 704. When the time arises to perform the regular-priority synchronization 206 (according to the regular-priority synchronization frequency 208), the object update cache 702 may be wholly synchronized with the remote data store 110 (e.g., simply sending the entire object update cache 702 to the remote data store 110), and the object updates 704 may be applied to respective objects 108 of the remote data store 110 to complete the regular-priority synchronization 206. Alternatively or additionally, the remote data store 110 may also comprise an object update cache 702, and the object updates 704 may be sent to the device 102 for application to the object set 106 stored thereby, optionally with a comparison of object updates 704 to the same object 108 in order to resolve conflicts. In this manner, a device 102 may be configured to achieve the differential synchronization 112 involving an object update cache 702 storing a set of object updates 704.

As a second variation of this third aspect, the device 102 and the remote data store 110 may communicate during the synchronization 112 in various ways. As one such example, the remote data store 110 may comprise a high-priority end point and a regular-priority end point (e.g., representing different network addresses and/or network ports). The device 102 may synchronize the high-priority objects 108 during the high-priority synchronization 210 through the high-priority end point, and may synchronize the regular-priority objects 108 during the regular-priority synchronization 206 through the regular-priority end point. This manner of partitioning the communication regarding the synchronization 112 may be advantageous, e.g., for enabling the remote data store 110 to allocate more resources for the high-priority synchronization 210 occurring on at the higher frequency, and/or for logging the different types of synchronization, such as for tracking throughout for comparison with the high-priority data threshold 214.

As a third variation of this third aspect, the device 102 and/or remote data store 110 may apply conflict resolution processes during the high-priority synchronization 210 and/or the regular-priority synchronization 206 (e.g., determining which of two updated version of an object 108 takes priority, and/or merging updates to two or more versions of an object 108). As one such example, it may be advantageous to expedite the high-priority synchronization 210 by resolving conflicts only during the regular-priority synchronization 206. Such conflict resolution during the regular-priority synchronization 206 may include resolving conflicts created during the high-priority synchronization 210 of the object set 106 (e.g., upon detecting that both versions of a high-priority object 108 have been updated while performing the high-priority synchronization 210, simply store both versions of the object 108, and perform conflict resolution during the regular-priority synchronization 206).

As a fourth variation of this third aspect, the high-priority objects 108 may be synchronized only during the high-priority synchronization 210, e.g., maintaining a partition between the high-priority objects 108 and the regular-priority objects 108. Alternatively, the high-priority objects 108 may also be synchronized during the regular-priority synchronization 206, e.g., factoring the synchronization 112 as a high-priority synchronization 210 of the high-priority subset of the object set 106 and a regular-priority synchronization 210 that comprehensively synchronizes the entire object set 106. These and other variations of the synchronization 112 may be included in embodiments of the techniques presented herein.

D4. High-Priority Synchronization Throttling

A fourth aspect that may vary among embodiments of the techniques presented herein involves the manner of throttling the high-priority synchronization 210 of the object set 106, e.g., the manner of calculating and applying the high-priority data threshold 214.

As a first variation of this fourth aspect, the high-priority data threshold 214 may be calculated in various ways. For example, the high-priority data threshold 214 may be selected from a high-priority data threshold set, comprising a high-priority synchronization maximum data threshold (e.g., a maximum amount of data exchanged in a particular instance of the high-priority synchronization 210 or over a particular period); a high-priority synchronization maximum object count threshold (e.g., a maximum number of objects 108 updated during a particular instance of the high-priority synchronization 210 or over a particular period); and a high-priority synchronization bandwidth consumption threshold (e.g., a maximum consumption of available bandwidth). A combination of such metrics may also be utilized (e.g., both a maximum available bandwidth threshold and a maximum object count).

As a second variation of this fourth aspect, the high-priority data threshold 214 may be adjusted in view of the available synchronization-related resources of the device 102 and/or the remote data store 110. As one such variation, an exemplary system 508 may include a high-priority data threshold selecting component that is configured to monitor a resource capacity of at least one synchronization resource of the device 102 (e.g., processor capacity or bandwidth), and to adjust the high-priority data threshold 214 in view of the resource capacities of the synchronization resources of the device 102. As a first such example, a device 102 and/or remote data store 110 may raise the high-priority data threshold 214 during busy periods in order to maintain high consistency of application state 126 while applications 124 in heavy use, and lower the high-priority data threshold 214 during idle periods in order to allocate computing resources away from synchronization and toward other idle-time tasks, since application state 126 is infrequently changing). As a second such example, the device 102 and/or the remote data store 110 may lower the high-priority data threshold 214 during busy periods in order to reallocate computing resources toward more significant computation, and may raise the high-priority data threshold 214 during idle periods in order to maintain highly consistent application state 126 when more significant computational tasks are not being performed.

As a third variation of this fourth aspect, the high-priority data threshold 214 may be applied by the device 102 and/or the remote data store 110. As a first such example, the high-priority data threshold 214 may be applied only by the device 102, or only by the remote data store 110, and the other of the device 102 and the remote data store 110 may allow unlimited high-priority synchronization 210. As a second such example, both the device 102 and the remote data store 110 may apply the high-priority data threshold 214 (e.g., both may track the total amount of data exchanged during high-priority synchronization 210). As a third such example, both the device 102 and the remote data store 110 may track and apply different high-priority synchronization thresholds 214 (e.g., each of the device 102 and the remote data store 110 may monitor local synchronization-based resource availability and throttle the high-priority synchronization 210 accordingly, e.g., upon exceeding a percentage of available bandwidth for either the device 102 or the remote data store 110).

As a fourth variation of this fourth aspect, when the high-priority synchronization 210 exceeds the high-priority data threshold 214, the device 102 and/or remote data store 110 may respond in various ways. As a first example, the device 102 and/or remote data store 110 may gently throttle the high-priority synchronization 210, e.g., substantially reducing the available bandwidth but allowing the high-priority synchronization 210 to continue. Alternatively, the device 102 and/or remote data store 110 may suspend and/or terminate the high-priority synchronization 210, and may resume or reinitiate the high-priority synchronization 210 at a later time (e.g., at the next instance of the high-priority synchronization frequency 212). As a second example, for any unsynchronized high-priority objects 108 that were not synchronized during the high-priority synchronization 210 due to the high-priority data threshold 214, the device 102 and/or remote data store 110 may wait until the next high-priority synchronization 210 to synchronize these unsynchronized high-priority objects 108, and/or may synchronize these objects 108 during the next regular-priority synchronization 206 (i.e., using the regular-priority synchronization 206 to complete the high-priority synchronization 210, and/or regarding the unsynchronized high-priority objects 108 as regular-priority objects 108). In such scenarios, it may be advantageous to perform the regular-priority synchronization 206 by synchronizing the high-priority objects 108 before the regular-priority objects 108 (thus utilizing the priority designation even for high-priority objects 108 that were not synchronized during the high-priority synchronization 210).

Figure 8:
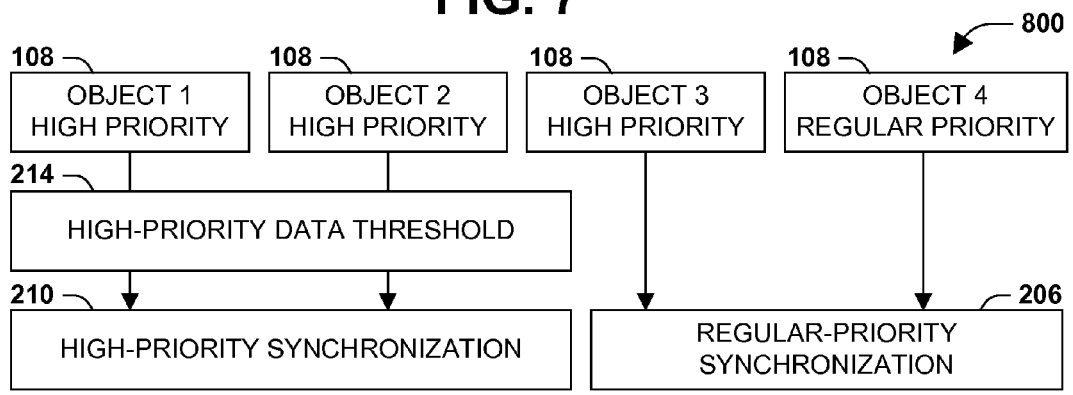
FIG. 8 is an illustration of an exemplary scenario featuring a first technique for throttling a priority-based synchronization of an object set with a remote data store.
Figure 9:
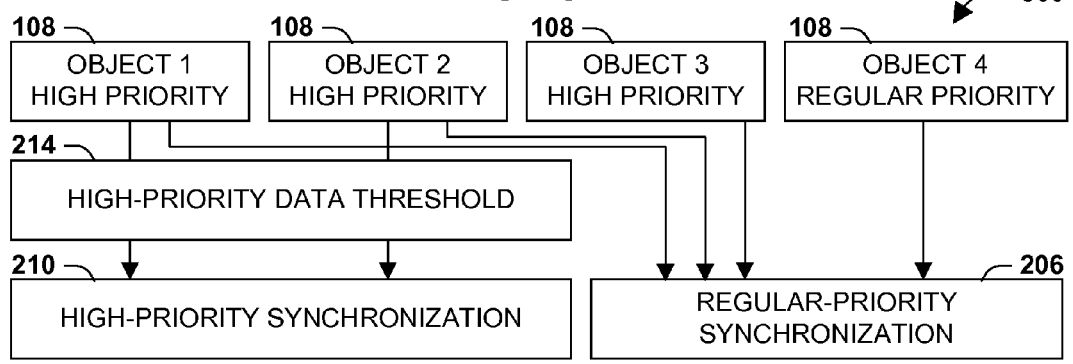
FIG. 9 is an illustration of an exemplary scenario featuring a second technique for throttling a priority-based synchronization of an object set with a remote data store.

FIG. 8 and FIG. 9 present two exemplary scenarios featuring such variations in the application of the high-priority data threshold 214 during the high-priority synchronization 210 to an objet set 106 comprising three high-priority objects 108 and a regular-priority object 108. In both exemplary scenarios, the first and second objects 108 are synchronized within the high-priority data threshold 214, but synchronizing the third the third object 108 may cause the high-priority synchronization 210 to exceed the high-priority data threshold 214. Accordingly, in the exemplary scenario 800 of FIG. 8, the third object 18 is synchronized during the regular-priority synchronization 206 instead of the high-priority synchronization 210. As additionally illustrated in the exemplary scenario 900 of FIG. 9, the high-priority objects 108 may be synchronized within the high-priority synchronization 210 and also during the regular-priority synchronization 206 in order to achieve a comprehensive synchronization of the object set 106 (optionally including other features, such as conflict resolution applied during the regular-priority synchronization 206 and not during the high-priority synchronization 210). These and other variations in the application of the high-priority data threshold 214 may be included in various embodiments of the techniques presented herein.

E. Computing Environment

Figure 10:
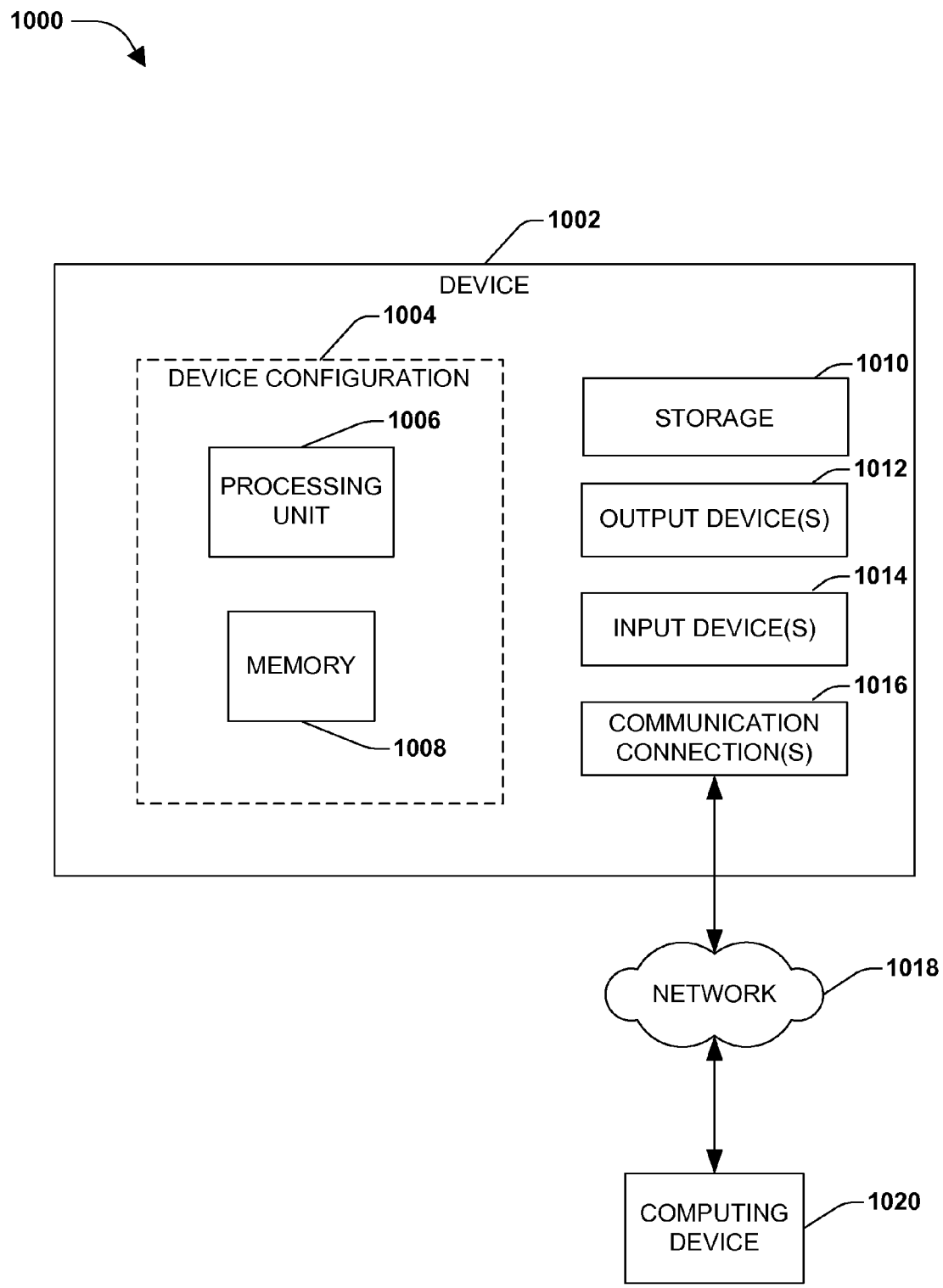
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of synchronizing objects of an object set with a remote data store, the method involving a device having a processor and comprising:
   executing, by the processor, instructions that cause the device to:
      identify respective objects of the object set as a high-priority object or a regular-priority object;
      perform a high-priority synchronization by synchronizing the high-priority objects of the object set with the remote data store at a high-priority synchronization interval and limiting the synchronization of the high-priority objects to a high-priority data threshold; and
      synchronize the regular-priority objects and the high-priority objects that were not synchronized during the high-priority synchronization with the remote data store at a regular-priority synchronization interval that is longer than the high-priority synchronization interval.

2. The method of claim 1, the identifying comprising: identifying respective objects as a high-priority object or a regular-priority object based on at least one prioritization criterion selected from a prioritization criteria set comprising:
   an object type of the object;
   a data access frequency of the object;
   a data update frequency of the object;

a data significance of the object;
a relationship with a second object of the object set; and
a user preference of a user of the device.

3. The method of claim 1:
the device comprising a high-priority object synchronization policy; and
identifying the respective objects of the object set comprising: identifying the respective objects of the object set as a high-priority object or a regular-priority object according to the high-priority object synchronization policy.

4. The method of claim 1:
the device comprising at least one application utilized by a user; and
identifying the respective objects of the object set comprising: determining whether the object is associated with an application utilized by the user within a utilization duration.

5. The method of claim 1, further comprising:
associating with respective high-priority objects a high-priority object identifier; and
identifying the respective objects of the object set comprising: determining whether the object is associated with a high-priority object identifier.

6. The method of claim 1, synchronizing the regular-priority objects comprising: resolving conflicts among the objects of the object set while synchronizing the regular-priority objects.

7. The method of claim 6, at least one conflict created while synchronizing the high-priority objects of the object set.

8. The method of claim 1, synchronizing the regular-priority objects of the object set comprising: synchronizing the regular-priority objects of the object set and the high-priority objects of the object set with the remote data store at the regular-priority synchronization interval.

9. The method of claim 1:
the remote data store comprising a high-priority end point and a regular-priority end point;
synchronizing the high-priority objects comprising: synchronizing the high-priority objects of the object set through the high-priority end point of the remote data store at the high-priority synchronization interval; and
synchronizing the regular-priority objects comprising: synchronizing the regular-priority objects of the object set through the regular-priority end point of the remote data store at the regular-priority synchronization interval.

10. A system for synchronizing objects of an object set with a remote data store on a device having a processor, the system comprising:
a object priority identifier that identifies respective objects of the object set as a high-priority object or a regular-priority object; and
an object set synchronizer that:
performs a high-priority synchronization by synchronizing the high-priority objects of the object set with the remote data store at a high-priority synchronization interval and limiting the synchronization of the high-priority objects to a high-priority data threshold; and
synchronizes the regular-priority objects and the high-priority objects that were not synchronized during the high-priority synchronization, with the remote data store at a regular-priority synchronization interval that is longer than the high-priority synchronization interval.

11. The system of claim 10:
the system further comprising:
a object cache configured to store object updates, and
a object caching component configured to, upon detecting an object update, store the object update in the object cache; and
the object set synchronization component configured to synchronize the objects with the remote data store by synchronizing the object updates in the object cache with the remote data store.

12. The system of claim 11:
the object caching component storing the object updates comprising: upon detecting an object update of a regular-priority object update, store the regular-priority object update in the object cache; and
the object set synchronization component configured to:
synchronize the updated regular-priority objects stored in the object cache with the remote data store at the regular-priority synchronization interval; and
synchronize the high-priority objects directly with the remote data store at the high-priority synchronization interval.

13. The system of claim 10, the high-priority data threshold selected from a high-priority data threshold set comprising:
a high-priority synchronization maximum data threshold;
a high-priority synchronization maximum object count threshold; and
a high-priority synchronization bandwidth consumption threshold.

14. The system of claim 10, further comprising: a high-priority data threshold selecting component configured to:
monitor a resource capacity of at least one synchronization resource of the device; and
adjust the high-priority data threshold in view of the resource capacities of the synchronization resources of the device.

15. The system of claim 10, the data object synchronization client configured to synchronize, at the regular-priority synchronization interval, the regular-priority objects of the object set and at least one unsynchronized high-priority object of the object set that has not been synchronized within the high-priority data threshold.

16. The system of claim 15, synchronizing the regular-priority objects comprising: synchronizing, at the regular-priority synchronization interval, the unsynchronized high-priority objects of the object set before synchronizing the regular-priority objects of the object set.

17. A method of synchronizing objects of an object set stored by a server with a device data store of a device, the method comprising:
identifying respective objects of the object set as a high-priority object or a regular-priority object;
performing a high-priority synchronization by synchronizing the high-priority objects of the object set with the device data source of the device at a high-priority synchronization interval and limiting the high-priority synchronization to a high priority data threshold; and
synchronizing the regular-priority objects of the object set and the high-priority objects of the object set that were not synchronized within the high-priority synchronization, with the remote data store at a regular-priority synchronization interval that is longer than the high-priority synchronization interval.

18. The method of claim 17:
the server comprising a high-priority end point and a regular-priority end point;

synchronizing the high-priority objects comprising: synchronizing the high-priority objects of the object set with the device data store through the high-priority end point; and synchronizing the regular-priority objects comprising: synchronizing the regular priority objects of the object set with the device data store through the regular-priority end point.

19. The method of claim 17, synchronizing the regular-priority objects comprising: resolving conflicts among the objects of the object set while synchronizing the regular-priority objects.

20. The method of claim 17:

synchronizing the high-priority objects comprising: synchronizing the high-priority objects of the object set with the device data store; and synchronizing the regular-priority objects comprising: upon receiving from the device an object update of a regular-priority object, apply the object update to the object in the object set.

* * * * *